(No Model.)
M. VIERENGEL.
CENTER REST FOR LATHES.
No. 568,551. Patented Sept. 29, 1896.
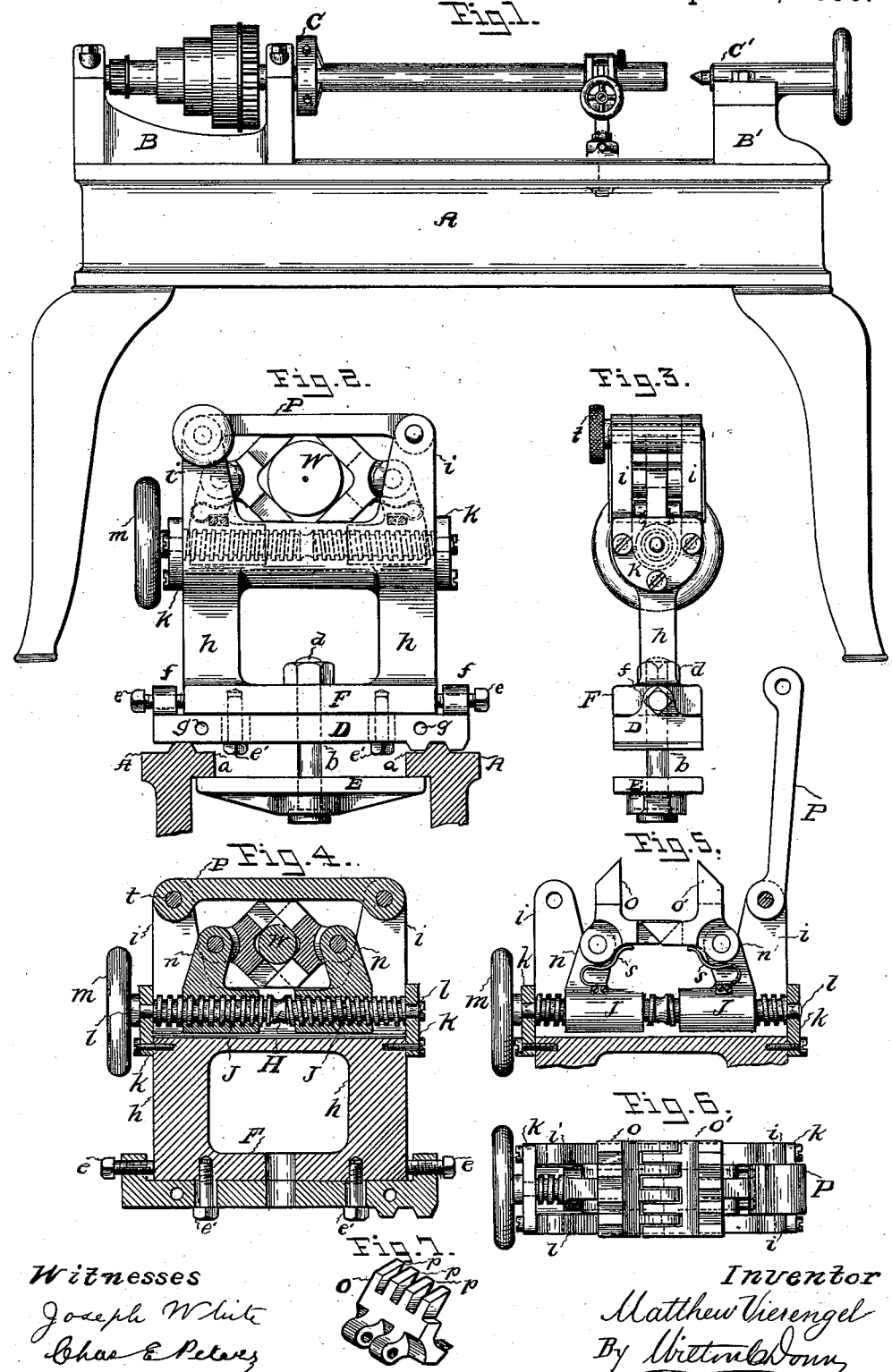
Witnesses
Joseph White
Chas. E. Peters
Inventor
Matthew Vierengel
By Wittmer & Donn
Atty
THE NORRIS PETERS CO., PHOTO-LITHO., WASHINGTON, D. C.

UNITED STATES PATENT OFFICE.

MATTHEW VIERENGEL, OF BROOKLYN, NEW YORK.

CENTER-REST FOR LATHES.

SPECIFICATION forming part of Letters Patent No. 568,551, dated September 29, 1896.

Application filed September 18, 1895. Serial No. 562,846. (No model.)

*To all whom it may concern:*

Be it known that I, MATTHEW VIERENGEL, a citizen of the United States, residing at Brooklyn, in the county of Kings and State of New York, have invented certain new and useful Improvements in Center-Rests for Lathes; and I do hereby declare the following to be a full, clear, and exact description of the invention, such as will enable others skilled in the art to which it appertains to make and use the same.

My invention relates to improvements in those attachments for engines and also for hand-lathes which are used for centering and also for steadying the work; and the objects of my improvements are, first, to produce a center-rest which shall be adapted to center the work automatically and with perfect accuracy without any previous adjustment; second, to construct a center-rest so that it can be fitted to any size or shape of lathe, (but I do not confine myself to making it in two parts. This is only a better way, but it can be done all in one piece,) and, third, to construct the centering or gripping jaws so as to avoid cutting or marring the work.

To these ends my invention consists, first, in a center-rest having centering or gripping jaws adapted to automatically adjust themselves to the center of the work; second, in a center-rest made in two parts to adapt it to be adjusted to any size or shape of lathe, and, lastly, in centering or gripping jaws made of the full width of the rest and adapted to interlock when closed on the work.

In the accompanying drawings, Figure 1 represents a side elevation of a lathe with my improved center-rest attached to it; Fig. 2, a side elevation of the center-rest enlarged, showing also the mode of attaching it to the lathe, and the work centered by the jaws; Fig. 3, an end view of the rest; Fig. 4, a cross-section of the same, showing centering-jaws closed on the work; Fig. 5, a cross-sectional view showing the centering-jaws open; Fig. 6, a top plan of the jaws. Fig. 7 is a perspective view of one of the jaws detached.

Referring to the drawings, A A are the lathe-shears, which are constructed in the usual manner, and carry head-stock B and tail-stock B' of the usual combination, C being a chuck, and C' the dead-center in the tail-stock. The center-rest is supported on a plate D, which rests on top of the shears and is secured thereto by a clamp E, bearing against the flanges $a\ a$ of the shears and fixed in place by means of a bolt $b$, passed up through the plate D and base F of the rest and secured by a nut $d$. The rest is fastened to the plate D by means of set-screws $e\ e$, passed laterally through flanges $f\ f$ on the plate, and bolts $e'\ e'$, passed up through slotted holes in the plate and into topped holes in the base of the rest, as shown more particularly in Fig. 4. By this mode of attaching the rest to the plate D it can be set accurately in line with the centers of the lathe—horizontally by means of the set-screws $e\ e$, and perpendicularly by underlaying the base with strips of thin material—first loosening the bolts to permit the rest to be raised, and then tightening them up again.

If it is desired to have the device serve as a follower steady-rest that will move along with the lathe-carriage for turning rods, shafts, and other long work, holes $g\ g$ in the plate D are provided for connecting it with the carriage. The frame of the rest consists of a casting comprising the base, uprights $h\ h$, rising therefrom and connected by a cross-piece at a point above the base, and from this point the casting is divided or forked so as to form on each side standards $i\ i$. At the base of the fork thus formed is placed a right and left threaded screw H, which is held in place by caps $k\ k$, screwed to the frame of the rest, and in which the reduced portions $l\ l$ of the screw-shaft H have bearing. The screw-shaft is operated by a hand-wheel $m$. On the right and left screws of the shaft H are mounted the sleeve-nuts J J, which by the turning of the said shaft are made to approach or recede from each other at will. The sleeves carry inclined arms $n\ n'$, to which are pivoted the centering-jaws $o\ o'$. The members of the centering-jaws are at about right angles to each other, with the ends chambered off at an angle of about forty-five degrees, and each member is provided with a series of indentations $p$, (those of one member alternating with those of the opposite member,) so that when the centering jaws are closed they interlock or articulate, as shown in Figs. 6 and 7. The centering-jaws are of the full width of the rest, thus presenting a broad bearing-surface for the work, which obviates cutting or marring the surface thereof. The centering-jaws are forced open and retained in their open position by means of springs s s, fastened at one end to the sleeve-nuts and having their free ends bearing against the under side of the lower members of the jaws. Between the standards i i on one side is pivoted the top plate or keeper P, which is adapted to be turned down so that its free end will pass between the standards on the opposite side, where it can be secured by means of a pin t, passed through holes in the standards and a corresponding hole in the keeper. This top plate or keeper is intended to hold the centering-jaws firmly, only allowing them a horizontal sliding motion toward and from each other.

To center a piece of work, say a shaft W, the keeper P is raised out of the standards which retain its free end to an upright position, as shown in Fig. 5, whereupon the springs s s throw the jaws open, the lower members, however, remaining interlocked. The distance between the jaws is then regulated by means of the right-and-left screw-shaft H, to adapt them to the size of the work to be centered. The work W is then placed between the jaws, whereupon they are closed together, as shown in Figs. 2 and 4, (interlocking where the work is of small diameter, as in Fig. 4,) the weight of the work overcoming the springs. The keeper P is closed down and fastened when it bears upon the level surface of the jaws and holds them steady. The screw-shaft H is then turned so as to cause the nuts to approach each other, which brings the jaws close against the work. When this is done, a line drawn through the center of the jaws will pass through the center of the work, and this tail center can now be screwed up to engage the end of the work as the centering is completed. This operation is almost instantaneous, as no adjustment of the center-rest to the lathe-centers is necessary, the action of the jaws being automatic.

It will be observed that the lower inclined ends of the jaws rest on the frame of the rest and the jaws are thus held below as well as above by the keeper.

It is to be understood that the construction of the center-rest in two parts, as heretofore described, is a mere matter of convenience and not an essential feature of my invention, and I do not therefore limit myself to that construction.

I claim—

1. In a center-rest for lathes, pivoted self-adjusting centering-jaws, the axes of which are parallel to the work, in combination with means for opening the jaws, means for holding them closed, and means for clamping them on the work, substantially as specified.

2. The combination of a suitable supporting-frame, a right-and-left screw-shaft, supported in the said frame, sleeve-nuts mounted on the said shaft adapted to be adjusted to and from each other and having arms projecting therefrom, centering-jaws pivoted to the said arms, springs for opening the said jaws and a top plate or keeper for holding the jaws steady, substantially as specified.

3. The combination with centering-jaws and right-and-left screw-shaft for adjusting the same, of a two-part frame comprising the adjustable base F and the parts connected therewith, and the flanged and slotted plate D, the said base and plate connected together by set-screws, for laterally adjusting the rest, and bolts to permit the rest to be raised and adjusted perpendicularly, substantially as specified.

In testimony that I claim the invention above set forth I affix my signature in presence of two witnesses.

MATTHEW VIERENGEL.

Witnesses:
 FREDK. HAYNES,
 CHAS. E. PETERS.